Nov. 9, 1965   G. J. M. DRUSCH   3,217,233
POWER SUPPLY UTILIZING STABILIZED RECTIFIERS
Filed Oct. 30, 1962                                     2 Sheets-Sheet 1

INVENTOR
GASTON JOSEPH MAURICE DRUSCH

BY *Imirie and Smiley*
ATTORNEYS

Nov. 9, 1965  G. J. M. DRUSCH  3,217,233
POWER SUPPLY UTILIZING STABILIZED RECTIFIERS
Filed Oct. 30, 1962  2 Sheets-Sheet 2

INVENTOR
GASTON JOSEPH MAURICE DRUSCH

BY *Irivine and Smiley*
ATTORNEY

United States Patent Office 3,217,233
Patented Nov. 9, 1965

3,217,233
POWER SUPPLY UTILIZING STABILIZED
RECTIFIERS
Gaston Joseph Maurice Drusch, 10 Rue Ribot,
Le Chesnay, Seine-et-Oise, France
Filed Oct. 30, 1962, Ser. No. 234,131
Claims priority, application France, Nov. 2, 1961, 877,762
4 Claims. (Cl. 321—27)

The invention relates to a power supply utilizing stabilized voltage rectifiers, that is to say, a device supplying a direct stabilized current with great accuracy, from an alternating current source, whose effective instantaneous value may undergo considerable fluctuations, whereas the charge on the direct current side may itself undergo considerable variations.

According to the invention, the stabilized type rectifier formed by means of a direct voltage source, connected in series with a second direct voltage source, followed by a regulator on which a first stabilized loop acts is characterized in that, in the first place, the rectifier comprises a series transistor, fed by the second voltage source, and in the second place, by the fact that a rectifying cell effects the coupling between the common point of the two voltage sources at the utilization charge.

According to another characteristic of the invention, the regulating element is formed by a transistor.

Various other characteristics of the invention will moreover be revealed by the detailed description which follows.

Forms of embodiment of the invention are shown, by way of non-restrictive examples, in the attached drawings.

Figure 1:
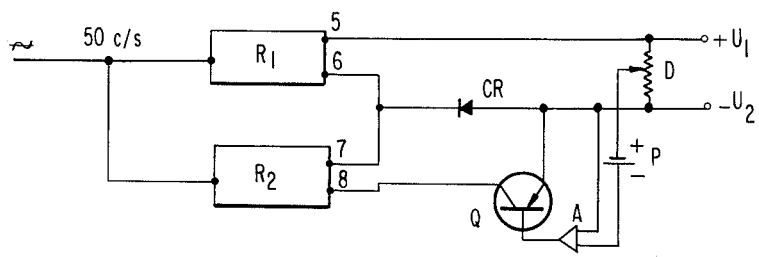
FIGURE 1 is a diagram of a first form of embodiment of the stabilized rectifier.

FIGURE 1 shows a first form of embodiment of the stabilized rectifier. The stabilized rectifier essentially comprises, starting from a 50 c./s. supply network, a first rectifier R1, which supplies a direct voltage between the terminals 5 and 6, and a second rectifier R2, connected in series with the former and which supplies a direct voltage between the terminals 7 and 8.

The output voltage appears between the poles U1 and U2, the regulating component is the transistor Q, whose transmitter is connected to the negative pole U2 and the collector to the negative pole of the rectifier R2. The joint pole 6, 7 of the rectifiers is connected to the negative terminal U2 of the output through a rectifying cell CR. The control of regulation takes place by varying the base transmitter potential of the transistor Q. This controlling potential is obtained in the conventional manner by establishing a regulating chain comprising a voltage divider D, a reference voltage source P, and a regulating amplifier A.

The coupling direction is such that an increase of the voltage U1–U2 tends to cause the blocking of the transistor Q.

Figure 2:
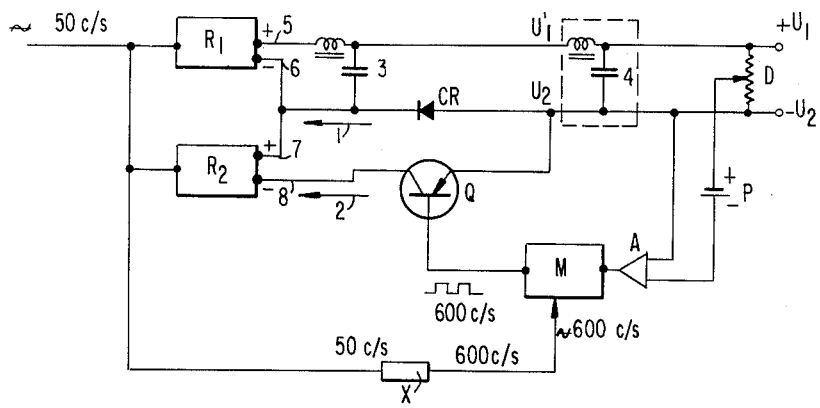
FIGURE 2 is a diagram of a second form of embodiment of the stabilized rectifier.

FIGURE 2 shows a second form of embodiment of the stabilized rectifier. This form of embodiment is the same in all points as the former, except with regard to the method of working of the regulating transistor Q.

The stabilized rectifier of FIGURE 2 essentially comprises, from a 50 c./s. supply network a first rectifier R1, which supplies a direct current between the terminals 5 and 6, and a second rectifier R2 connected in series with the former and which supplies a direct current between the terminals 7 and 8. The output load being connected between the poles U1 and U2, the regulating component Q whose transmitter is connected to the negative pole U2 and the collector to the negative pole of the rectifier R2. The common terminal 6 and 7 of the rectifiers R1, R2 is connected to the negative output U2 through a rectifying cell CR. The control of the regulating transistor Q takes place by means of a regulating chain comprising a wobbler M, a regulating amplifier A, a reference pole P and a voltage divider placed between the terminals U1 and U2.

The transistor Q operates in rectangular pulses with a modulation time, that is to say, that the modulator M causes the ratio to vary between the conduction time and the blocking time of this transistor Q.

Figure 3:
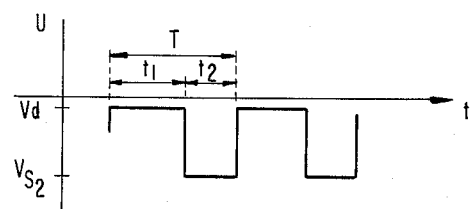
FIGURE 3 is a diagram showing the voltage ratio in time function.

FIGURE 3 shows the potential between transmitter and collector of the transistor Q.

The modulation period being T (in the case of the example described farther on, 1.67 ms.), during the conduction period $t1$, the transistor Q is a conductor and the voltage between collector and transmitter drops to a very low figure (about 0.3 v.). We see that the voltage available at the terminals U1 and U2 is then equal approximately to the sum of the voltages of the rectifiers R1 and R2.

During the blocking period $t2$, the transistor Q does not conduct, and the current in the output passes through the rectifier CR (FIGURE 2). The voltage available at the output is then equal to the voltage of the rectifier R1.

Figure 4:
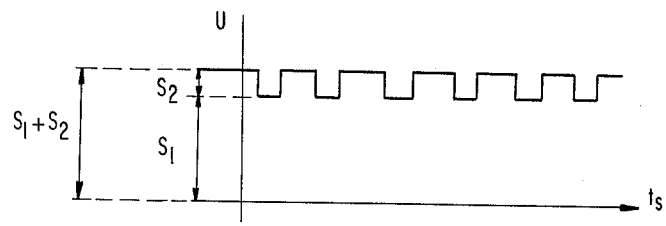
FIGURE 4 is a diagram showing the form of the resultant voltage in function of the elementary tenisons and time.

If we show (FIGURE 4) the voltage measured between the terminals U1 and U2 of the device, we see that this refers to a modulated voltage whose minimum is equal to S1, the voltage of R1, and whose maximum is equal to $S1+S2$, the sum of the voltages of R1 and R2.

The filter 4, composed of a reactor and a condenser, only allows the mean value to pass of the voltage U1, U2, whose value is equal to $$S1 + \frac{S2 t1}{t1 + t2}$$

The fraction $$\frac{t1}{t1' + t2}$$

is the modulation ratio whose value is comprised between 0 and 1.

We see that thus we have available, at the output U1, U2, a voltage whose value can be regulated between S1 and $(S1+S2)$ by causing the modulation ratio to vary.

The wobbler M is a device intended to produce rectangular pulses modulated in duration and whose modulation ratio is a function in linear principle of a direct control voltage.

An assembly of known devices is formed, namely:

(a) A device for forming the sinusoidal voltage c./s. 600.

(b) An integrator which converts the rectangular pulses into triangular pulses.

(c) A summation circuit where the direct control voltage is superimposed on the triangular pulses.

(d) A circuit for shaping formed by a multivibrator (Schmitt rocker) which supplies rectangular pulses modulated in time.

The c./s. 600 multiplicator denoted by X (FIGURE 2) is also conventional.

In the general case of a three-phase network supply, this essentially refers to a three-phase bridge which is solely extracted from the alternating component and a doubler formed by a single-phase bridge.

The remainder of the regulating chain is conventional.

This second form of embodiment is interesting for two reasons:

(I) The regulating component.

The transistor Q operates in strictly controlled dissipation conditions and converse voltages.

Actually, the converse voltage S2 is equal to the voltage of the rectifier R2 increased by the drop of direct voltage in the cell CR.

The dissipation at the terminals of the transistor Q comprises three parts:

(a) During the conduction period, it is equal to the product of the rejection voltage VD by the current. This rejection voltage is always very low (for example, for a transistor 2N174 and for a current of 15 a., $VD=0.3$, being a maximum dissipation of 3.5 w.).

(b) The losses during the blocking period are equal to the product of the voltage S2 by the current of the transistor Q. These losses are, in general, negligible.

(c) The power dissipated at the moment of switching is equal to the product of the frequency switching by the integral of the product direct-current-direct-voltage in the transistor Q during switching.

For a 2N174 transistor working at 15 a. with a frequency of 600 c./s., switching losses are 15 w.

(II) The regulating component only manipulates the make-up power necessary for stabilization.

The dimensioning of the stabilized rectifier described above takes place in the following manner:

The values are determined, for extreme working conditions, both for the charge and network voltage, that are to be given to the direct supply voltage of the rectifier for obtaining a constant output voltage.

The difference between the extreme values thus found is equal to the value of the voltage S2.

The voltage S1 is calculated according to the relations $U1-U2=S1+0.5S2$.

Figure 5:
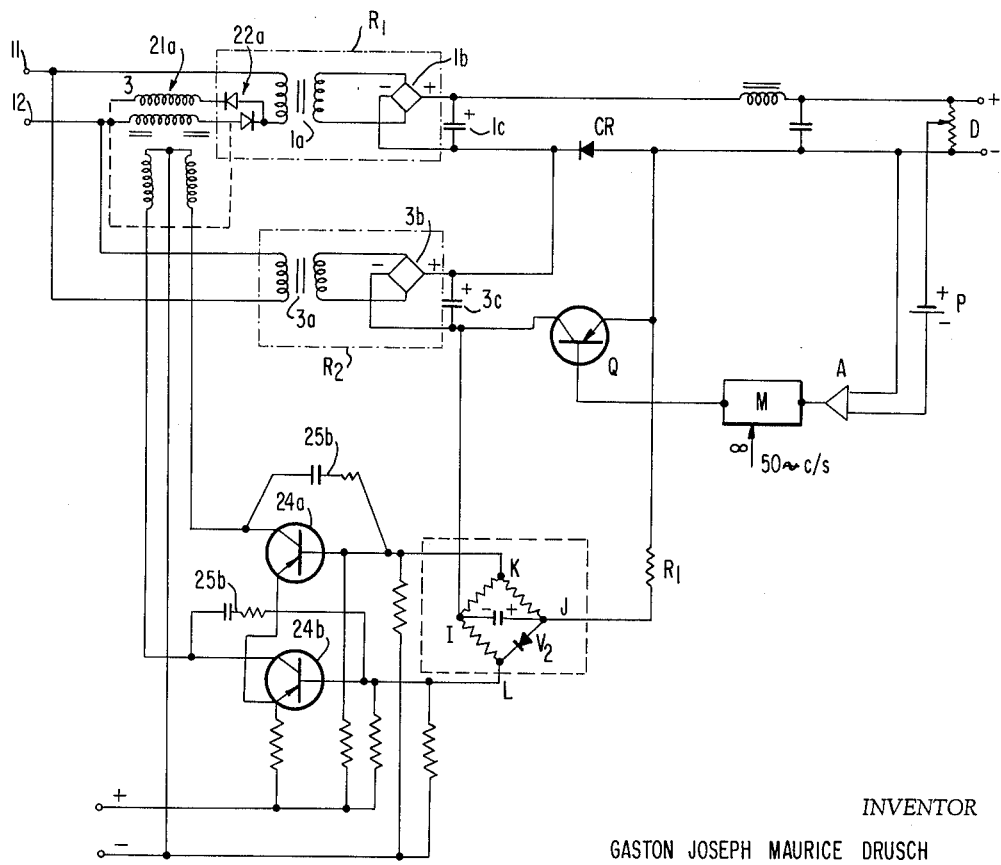
FIGURE 5 is a diagram of a third form of stabilized rectifier.

A third form of embodiment of the stabilized rectifier is shown in FIGURE 5. In this form of embodiment, the regulator Q and the rectifier R2 work as described in the second form of embodiment; on the other hand, the value of the voltage S1 delivered by the rectifier R1 is made adjustable.

Said stabilized rectifier chiefly comprises the following elements: a rectifier corresponding to R1 of FIG. 2 composed of the transformer 1a of the rectifying cell 1b, of the filtering condenser 1c and a magnetic amplifier 3 comprising coils 21a and rectifying cells 22a connected between the supply network terminals 11 and 12 for rectifiers R1 and R2 and the primary of the transformer 1a.

The rectifier corresponding to R2 of FIG. 2 is formed by the transformer 3a directly fed from the alternating current source 11–12. This transformer feeds the rectifying cell 3b and the filter condenser 3c.

The direct regulating chain is composed, as for the second form of embodiment previously described, by the transistor Q working in time modulation under the influence of the regulating chain comprising the voltage divider D, the reference cell P, the amplifier A and the wobbler M. As in the former case, the rectifying cell CR effects the coupling between the rectifiers. The regulating of the direct voltage value available at the condenser terminals 1c takes place from the terminals of the regulating transistor Q.

The rectifying unit R1 is automatically regulated so that the mean value of the voltage between transmitter and collector of the transistor Q is kept constant at the value 0.5R2.

To this end, the secondary reaction loop, working, moreover, according to known principles, is formed for regulating the magnetic amplifier 3. This secondary reaction chain comprising the limit bridge IJKL, of which one element is sensitive to the voltage (diode Zener). The diagonal IJ of this limit bridge is connected between collector and transmitter of the transistor Q. The diagonal KL of the limit bridge is connected to the bases of the two amplifying transistors 24a and 24b. A direct current circulates in the control winding of the magnetic amplifier 3, in such manner that for a zero voltage between the terminals KL of the limit bridge, the collector currents of the transistors 24a and 24b are equal, and on this account, the magnetic field of the magnetic amplifier control 3 is zero. The coupling direction is such that when the voltage between transmitter and collector of the transistor Q tends to increase, the circulation direction of the currents in the magnetic amplifier tends to block the latter, producing the required reverse effect.

A device has thus been produced comprising a rapid regulating chain Q and a slow regulating chain (magnetic amplifier 3).

The slow chain intervenes for keeping the voltage constant at the terminals of the transistor Q; in this way, the rapid voltage variations of the rectifier feed terminals 11, 12 are instantaneously compensated by the action of the rapid chain.

Various modifications can moreover be applied to the forms of embodiment given as examples, without going outside of the scope of the invention.

I claim:

1. A regulated power supply for operation from an A.C. power source, comprising first and second rectifiers connected in series, means for connecting said rectifiers to the A.C. power sources to pass D.C. current in the same direction, a pair of D.C. output terminals one of which is connected to the positive side of the first rectifier and the other being connected to the negative side of said first rectifier and the positive side of the second rectifier, a transistor connected in a series circuit with said second rectifier and one of said output terminals, means connecting said transistor to said first rectifier causing said transistor to perform a switching function, and a rectifier cell positioned in said series circuit to shunt the collector and transmitter of said transistor and having such polarity that the direction of the current thereof coincides with the direction of load current supplied by said output terminals.

2. A regulated power supply according to claim 1 wherein said means connecting the transistor to perform a switching function comprises an amplifier, a reference voltage cell and a voltage divider in series across said output terminals, the output of said amplifier being connected to the base of said transistor.

3. A regulated power supply according to claim 2 wherein said means for connecting said first and second rectifiers to an A.C. power source includes a magnetic amplifier arranged to control the voltage of said first rectifier as a function of the voltage drop of said transistor, said magnetic amplifier being connected to said series circuit.

4. A regulated power supply for operation from an A.C. power source, comprising first and second rectifiers connected in series, means for connecting said rectifiers to the A.C. power sources to pass D.C. current in the same direction, a pair of D.C. output terminals one of which is connected to the positive side of the first rectifier and the other being connected to the negative side of said first rectifier and the positive side of the second rectifier, a transistor having its collector and transmitter connected in a series circuit with said second rectifier and a third rectifier, said series circuit being connected to said other output terminal, said third rectifier having such polarity that the direction of the current thereof coincides with the direction of load current supplied by said output terminals, and means connecting the base of said transistor to said first output terminal.

References Cited by the Examiner
UNITED STATES PATENTS

| | | | |
|---|---|---|---|
| 2,886,761 | 5/59 | Rabier | 321—19 |
| 3,068,392 | 12/62 | Santelmann | 321—18 |
| 3,076,130 | 1/63 | Brunette et al. | 321—25 |
| 3,156,860 | 11/64 | Paynter | 321—18 |

LLOYD McCOLLUM, Primary Examiner.